April 12, 1966

R. J. PURTELL 3,245,608

IRRIGATION SYSTEM

Filed March 12, 1963

RUFUS J. PURTELL
INVENTOR.

BY
Atty.

RUFUS J. PURTELL
INVENTOR.

April 12, 1966 R. J. PURTELL 3,245,608
IRRIGATION SYSTEM
Filed March 12, 1963 3 Sheets-Sheet 3
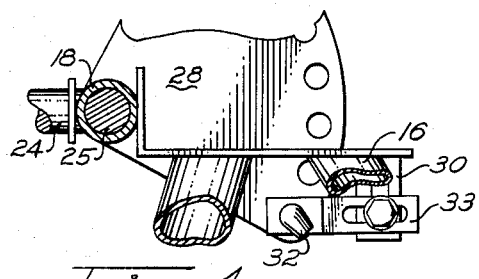
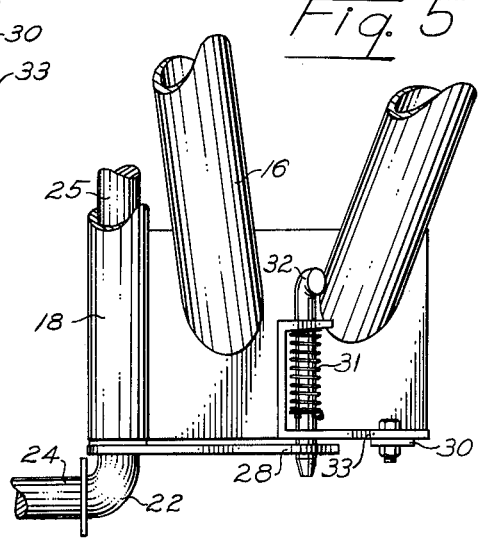
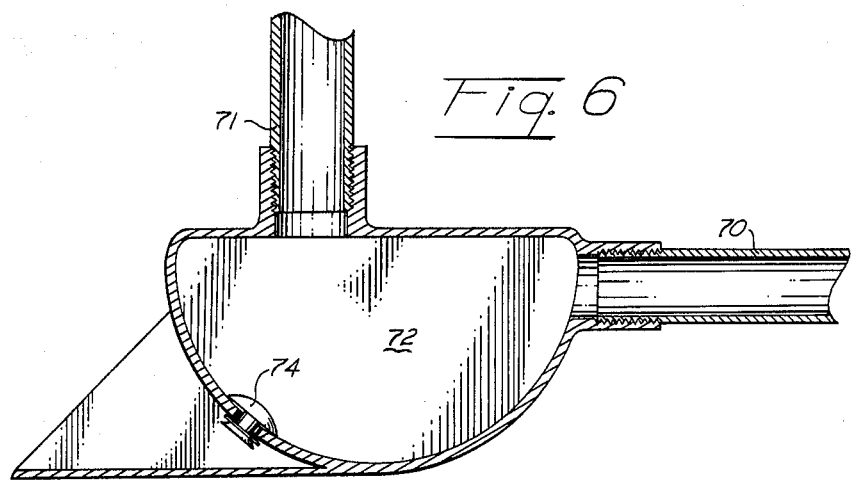
RUFUS J. PURTELL
INVENTOR.
BY

United States Patent Office 3,245,608
Patented Apr. 12, 1966

3,245,608
IRRIGATION SYSTEM
Rufus J. Purtell, Brownfield, Tex., assignor, by mesne assignments, to The J. B. Knight Co., Inc., Brownfield, Tex., a corporation of Texas
Filed Mar. 12, 1963, Ser. No. 264,507
15 Claims. (Cl. 239—212)

This invention relates to agricultural irrigation and more particularly to a vehicle system for moving agricultural irrigation sprinkler pipe from one location to another.

Reference is made to my following patent applications which are either co-pending with this application or were co-pending with applications which are now co-pending.

| Serial No. | Filing Date | Patent No. | Issue Date |
|---|---|---|---|
| 760,469 | Sept. 11, 1958 | 3,009,646 | Nov. 21, 1961 |
| 26,636 | Apr. 19, 1960 | 3,220,654 | |
| 71,667 | Nov. 25, 1960 | 3,072,268 | Jan. 8, 1963 |
| 95,645 | Mar. 14, 1961 | 3,094,282 | June 18, 1963 |
| 153,628 | Nov. 20, 1961 | (Now Abandoned) | |
| 172,997 | Feb. 13, 1962 | 3,087,680 | Apr. 30, 1963 |
| 226,201 | Sept. 26, 1962 | (Now Abandoned) | |
| 236,474 | Nov. 5, 1962 | 3,157,193 | Nov. 17, 1964 |

An object of this invention is to provide a vehicle which will move an elongated pipe either normal to its axis, in a direction aligned with its axis, or at angles intermediate thereof.

Another object is to provide a quicker, less expensive means for draining water from a pipe thereby lightening the pipe while it is being moved.

A further object is to provide a means for connecting trailing tubes to the pipe so that they do not tend to overturn the vehicles when the vehicles are being moved and dragging the trailing tubes.

Still further objects are to achieve the above with a device that is sturdy, compact, durable, simple, versatile, and reliable, yet inexpensive and easy to manufacture and operate.

The specific nature of the invention as well as other objects, uses, and advantages thereof will clearly appear from the following description and from the accompanying drawings, the different views of which are not necessarily to the same scale, in which:

FIG. 4 is an enlarged plan view of a portion of the vehicle, taken on line 4—4 of FIG. 3.

FIG. 5 is an enlarged elevational view of a portion of the vehicle, taken on line 5—5 of FIG. 3.

FIG. 6 is an enlarged sectional view of the connector at the end of a trailing tube, taken on line 6—6 of FIG. 7.

FIG. 7 is a partial plan view of the system showing the vehicles and trailing tubes in combination.

Figure 1:
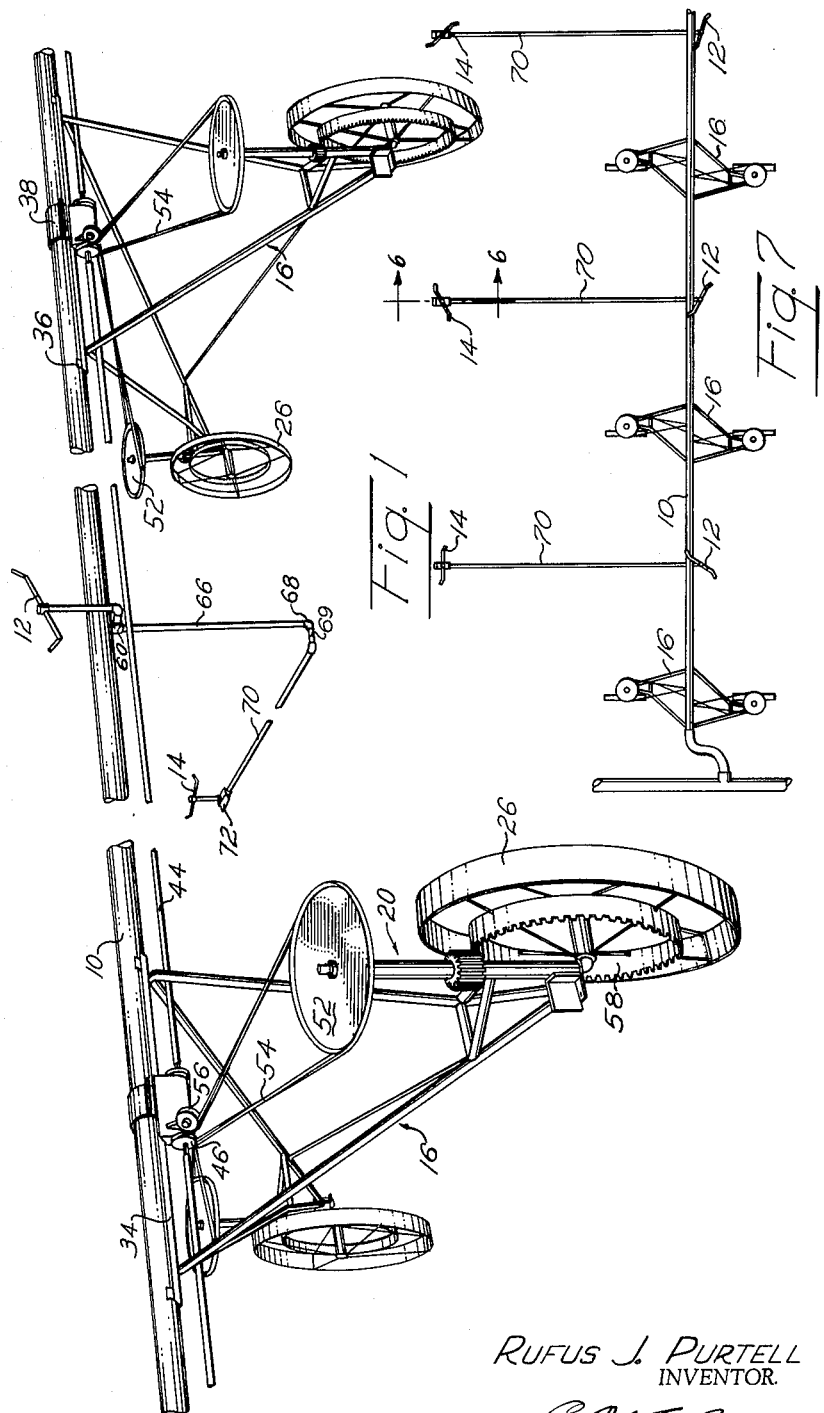
FIG. 1 is a perspective view with parts foreshortened showing the pipe, vehicles, and trailing tubes of this invention.
Figure 2:
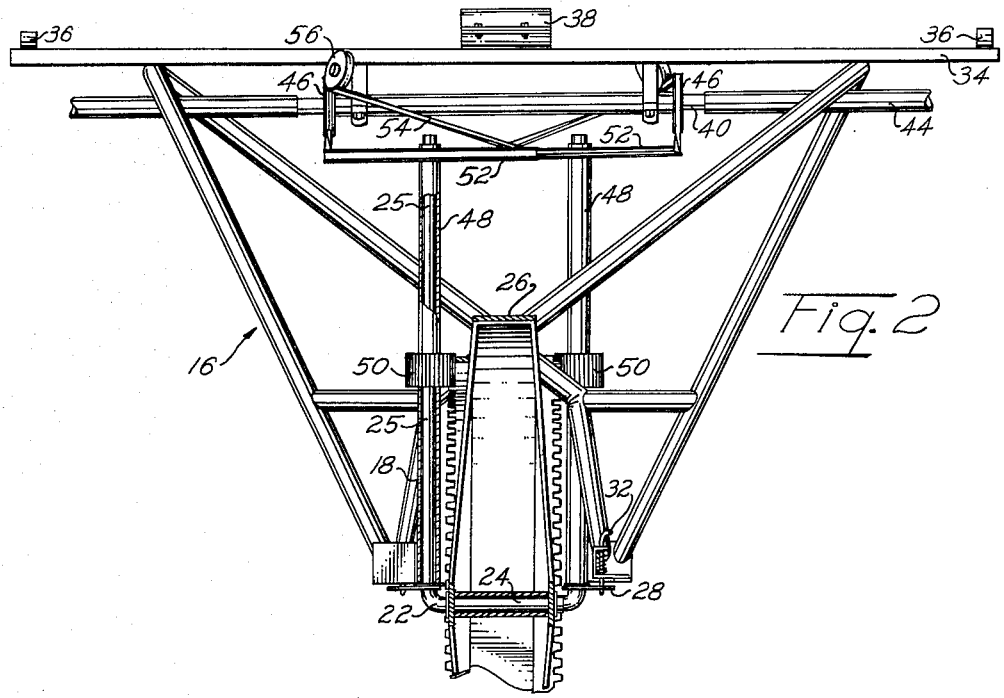
FIG. 2 is a partial front view of one of the vehicles according to this invention with parts broken away.

As may be seen from the accompanying drawings, vehicles are provided to move pipe 10 to different parts of the field so that the sprinklers 12 and 14 may distribute water to the land to be irrigated. The pipe 10 is adapted to carry water under pressure from a source that is well-known to the art and partially shown schematically in FIG. 7. The pipe 10 is supported by frame 16. The frame 16 contains two vertical tubes 18 to which bracket 20 is mounted for rotation. The bracket 20 is mounted for rotation about a vertical axis. The bracket 20 is basically in the form of an L-shaped shaft 22. This shaft 22 has horizontal portion 24 which acts as the axle or spindle for ground bearing element or ground engaging wheel 26. Vertical portion 25 of the shaft 22 is telescoped within the tube 18. Horizontal quadrant plate 28 is welded to the shaft 22 immediately below the tube 18. This plate is parallel to plate 30 which is welded to the frame 16. The quadrant plate 28 has a plurality of holes therethrough for the reception of pin 32 which is biased by spring 31 downward. The pin 32 is carried on bracket 33 which is bolted to plate 30 as shown. The bracket 20 may be positioned in a plurality of rotated positions about the vertical axis of the tube 18 by the interaction of the pin 32 and the holes in quadrant plate 28.

Horizontal trough 34 is mounted on the frame 16 halfway between the tubes 18. Saddles 36 are at either end of the trough 34 to carry the pipe 10. Clamp 38 is in the middle of the trough 34 and securely attaches the pipe 10 to the trough 34 and thus to the frame 16. Shaft 40 is mounted for rotation about its axis in bearings (not shown) which are attached to the frame 16. The axis of the bearings is parallel to the longitudinal axis of the trough 34 so that the shaft 40 is parallel to the pipe 10. The shaft 40 of one vehicle is connected to the shaft 40 of the adjacent vehicle by hollow drive shaft 44 extending along the pipe 10. Means for rotating the hollow shaft 44 are provided but are not shown inasmuch as they are well-known to the art. This means for rotating may include an internal combustion engine, a water engine, an electric engine, or other well-known means. The shaft 40 has two small pulleys or sheaves 46 thereon.

Sleeve 48 is mounted for rotation upon the vertical portion 25 of shaft 22 immediately above the tube 18. Pinion 50 is securely but adjustably attached to the lower end of the sleeve 48. The supper end of the sleeve 48 carries large circular element or pulley or sheave 52. V-belt 54 connects the small sheave 46 with the large sheave 52. The axis of rotation of the large and small sheaves are not parallel but it is well-known to drive non-parallel sheaves by V-belts. Idler pulleys 56 attached to frame 16 are provided to remove slack from the belt 54. Ring gear 58 is attached to each wheel 26 concentrically therewith by any convenient, conventional means as by welding to the spokes of the wheel. The ring gear 58 meshes with the pinion 50. The pinion 50 is approximately two inches in height although the ring gear 58 is quite narrow. By this arrangement I am able to make the vertical adjustment in the pinion 50 aforementioned so that an unworn portion of the pinion may be meshed with the ring gear 58. The vehicle is the frame 16 with the trough 34 and wheels 26.

I have provided a means for rotating the wheel 26 about its horizontal axis responsive to rotation of the shaft 40 regardless of the position of the bracket 20 about its vertical axis. The advantage of using the V-belts will be understood from their inherent characteristics. It will be understood by those skilled in the art that lugs may be provided on the wheels 26 to provide better traction if desired.

T 60 is connected to the bottom of pipe 10 at intervals. The T 60 provides a conduit for removing water from the pipe 10. The sprinkler 12 is attached to the pipe 10 by L 64 in supplemental conduit 62 which is connected to T 60. A second supplemental conduit 66 extends downward from the T 60. It extends downward to elbow 68 which is about the same elevation as the spindles 24 of the wheels 26. Trailing tube 70 extends backward from the elbow 68 through swivel joint 69 to connector or sled 72. The sprinkler 14 is connected to the connector 72 by riser 71 as described in my prior patent application Serial No. 236,474 identified above. The connector 72 contains valve 74 which is responsive to pressure in the connector 72, tube 70, conduit 66 and pipe 10 so that if there is no pressure in the pipe 10, it drains the water from the pipe, conduit, tubes, and connector. However, if there is pressure in the pipe 10, the valve 74 maintains pressure and will not permit the water to drain. It will be understood that a plurality of sprinklers 14 could be attached to each trailing tube 70 as disclosed in my prior applications.

It may be seen by the arrangement of having the trailing tubes 70 connected by means of a conduit 66 to the bottom of the pipe 10 that it is not necessary to have valves in the bottom of the pipe 10 for draining the pipe but they are drained through the trailing tubes 70.

Also analysis will show that having the trailing tubes 70 connected by a conduit 66 which is rigidly attached to the pipe 10 and extends downwardly therefrom is advantageous. If the trailing tube 70 has a high resistance to being pulled along the ground it does not tend to overturn the vehicle. If the risers 71 were connected directly by a straight tube from the connector 72 to the pipe 10, when the connector 72 struck a resistance such as snagging on a plant or other obstruction along the ground, it will tend to overturn the vehicle inasmuch as the pipe 10 is located above the center of the wheel 26. However, analysis will show that by having the rigid connection extending downward then if the trailing tube 70 strikes an obstruction, the tendency to tilt the vehicle is not so great. The arrangement as shown and described will result in better weight distribution on each wheel while pulling.

It will be noted that the frame 16 is constructed of hollow tubing so that it is particularly lightweight.

Figure 3:
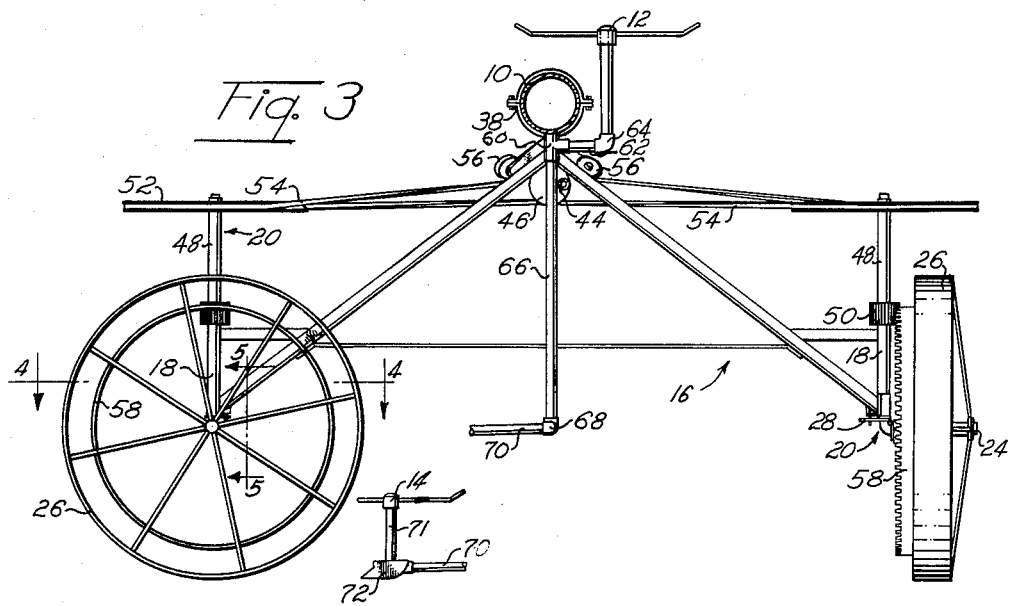
FIG. 3 is a side cross section of this system showing the pipe in section and the vehicle with one wheel set to move in one direction and one wheel set to move in another direction for the purposes of illustration, and with the tubes 70 broken for the purposes of illustration.

Inasmuch as the vehicles are spaced at wide intervals along the pipe it may be understood that the pipe may sag some between vehicles. However, if the T's are connected approximately half-way between vehicles they would be at the low point and drain the pipe 10 fully. Also it will be understood that the hollow shafts 44 have enough flexibility between vehicles that they will by-pass around the conduit 66 and the T 60 as seen in FIG. 3.

Thus it may be seen that I have provided a vehicle which will transport the pipe 10 either normal to its axis, in a direction aligned with the axis of pipe 10 or at any intermediate angle.

It will be apparent that the embodiment shown is only exemplary and that various modifications can be made in construction, materials, and arrangement within the scope of the invention as defined in the appended claims.

I claim as my invention:

1. In an agricultural irrigation system having
   (a) an elongated pipe adapted to carry water under pressure and adapted to carry sprinklers thereon,
   (b) a plurality of vehicles,
   (c) at least two wheels on each vehicle,
   (d) said pipe attached to each vehicle above the center of the wheels, and
   (e) means for moving the vehicles; the improvement comprising in combination:
   (f) a plurality of tubes which trail behind the pipe and drag on the ground as the pipe is moved by the vehicles, each tube adapted to carry a sprinkler thereon,
   (g) each tube connected to the pipe by a conduit
   (h) which extends downwardly from the pipe and
   (i) is rigidly attached to the pipe, so that the drag of the tube has a reduced tendency to overturn the vehicle wherein
   (j) the conduit is attached to the pipe at the bottom of the pipe, and
   (k) each tube carries a connector at the end thereof, and
   (l) means in each connector responsive to pressure in the pipe, conduit, tube, and connector for draining the contents of the connector and thus draining the tube, conduit and pipe.

2. The invention as defined in claim 1, wherein
   (j) said conduit is a branch of a main conduit
   (k) attached to the bottom of the pipe and
   (l) a second branch from said main conduit extends upward and is adapted to have said sprinklers which are adapted to be carried on the pipe attached to said second branch conduit.

3. In an agricultural irrigation system having
   (a) an elongated pipe adapted to carry water under pressure and adapted to carry sprinklers thereon,
   (b) a plurality of vehicles supporting said pipe elevated above the ground and
   (c) means for moving said vehicles; the improvement comprising in combination:
   (d) a plurality of elongated tubes which trail behind the pipe as it is moved by the vehicles,
   (e) each tube attached to the bottom of said pipe,
   (f) a connector on the end of each elongated tube adapted to carry a sprinkler, and
   (g) means in each connector responsive to pressure in the pipe, tube, and connector for draining the contents of the connector and thus draining the tube and pipe.

4. The invention as defined in claim 3 wherein
   (h) the attachment of the tube to the bottom of said pipe includes a conduit which is rigidly attached to the bottom of said pipe and extends downward from said pipe.

5. The invention as defined in claim 3 wherein
   (h) each vehicle has a frame,
   (i) a bracket interconnecting each wheel to the frame,
   (j) said bracket mounted to the frame for rotation about a vertical axis,
   (k) a shaft mounted to the frame for rotation about its axis, and
   (l) means attached to the bracket for rotating the wheel about its horizontal axis responsive to rotation of the shaft regardless of the position of the bracket.

6. In an agricultural irrigation system having
   (a) an elongated pipe adapted to carry water under pressure,
   (b) a plurality of vehicles supporting said pipe elevated above the ground, and
   (c) means for moving said vehicles; the improvement comprising in combination:
   (d) a plurality of conduits connected to the bottom of said pipe,
   (e) each conduit branched into two supplemental conduits,
   (f) a sprinkler attached to one supplemental conduit of each branch,
   (g) an elongated tube which trails behind the pipe as it is moved by the vehicles attached to the other supplemental conduit of each branch,
   (h) a connector on the end of each elongated tube,
   (i) a sprinkler on each connector, and
   (j) means in each connector responsive to pressure in the pipe, conduit, tube, and connector for draining the contents of the connector and thus draining the tube, conduit, and pipe.

7. The invention as defined in claim 6 wherein
   (k) the other supplemental conduit of each branch extends downward from said pipe whereby stress from the resistance to pulling the trailing tubes is transmitted by said conduit which in such case acts as a lever and is transformed into a torque on said pipe, said torque being transmitted to the vehicle thereby relieving the tendency for the vehicles to overturn.

8. The invention as defined in claim 6 wherein
   (k) each vehicle has a frame,
   (l) a bracket interconnecting each wheel to the frame, (m) said bracket mounted to the frame for rotation about a vertical axis,
(n) a shaft mounted to the frame for rotation about its axis, and
(o) means attached on the bracket for rotating the wheel about its horizontal axis responsive to rotation of the shaft regardless of the position of the bracket.

9. In an agricultural irrigation system having
(a) an elongated pipe adapted to carry water under pressure and adapted to carry sprinklers thereon,
(b) a plurality of vehicles,
(c) each vehicle having a frame,
(d) at least two wheels on each vehicle, each wheel mounted for rotation about a horizontal axis, and
(e) means for attaching the pipe to the frame; the improvement comprising in combination:
(f) a shaft mounted for rotation on each vehicle, a drive shaft extending along the pipe connecting the shafts of each vehicle,
(g) at least one bracket interconnecting one of the wheels to the frame of each vehicle,
(h) said bracket mounted for rotation about a vertical axis,
(i) a pulley mounted on the bracket co-axial with the vertical axis,
(j) means for rotating the pulley responsive to rotation of the shaft, and
(k) means for rotating the wheel interconnected by the bracket responsive to rotation of the pulley
(l) a plurality of elongated tubes which trail behind the pipe as it is moved by the vehicles,
(m) each tube attached to the bottom of said pipe,
(n) a connector at the end of each elongated tube adapted to carry a sprinkler, and
(o) means in each connector responsive to pressure in the pipe, tube, and connector for draining the contents of the connector and thus draining the tube and pipe.

10. In an agricultural irrigation system having
(a) an elongated pipe
(b) supported by a plurality of vehicles,
(c) the pipe adapted to carry water under pressure,
(d) the pipe adapted to carry sprinklers to sprinkle water upon the land to be watered,
(e) a drive shaft mounted for rotation along the pipe for transmitting power to the vehicles, and
(f) each vehicle having an earth bearing element bearing against the earth to support the pipe; the improvement comprising in combination with the above:
(g) a vertical shaft connected to the earth bearing element,
(h) means interconnecting the vertical shaft and the pipe for supporting the pipe,
(j) means for supporting the pipe pivoted to the vertical shaft so that the vertical shaft and the earth bearing element may rotate about the vertical axis of the vertical shaft under the pipe,
(k) a circular element aligned with the vertical axis mounted on the vertical shaft for rotation,
(m) means interconnecting the drive shaft and said circular element for transmitting rotational power from the drive shaft to the circular element, and
(n) means interconnecting the circular element and said earth bearing element for transmitting power from the circular element to the earth bearing element for moving the vehicle and thus the system, so that the system may be moved in a plurality of directions by rotation of said drive shaft.

11. In an agricultural irrigation system having
(a) an elongated pipe
(b) supported by a plurality of vehicles,
(c) the pipe adapted to carry water under pressure,
(d) the pipe adapted to carry sprinklers to sprinkle water upon the land to be watered,
(e) a drive shaft mounted for rotation along the pipe for transmitting power to the vehicles, and
(f) each vehicle having an earth bearing element bearing against the earth to support the pipe; the improvement comprising in combination with the above:
(g) a vertical shaft connected to the earth bearing element,
(h) means interconnecting the vertical shaft and the pipe for supporting the pipe,
(j) said means for supporting the pipe pivoted to the vertical shaft so that the vertical shaft and the earth bearing element may rotate about the vertical axis of the vertical shaft under the pipe, and
(k) power transmission means interconnecting the drive shaft and the earth bearing element for transmitting power from the drive shaft to the earth bearing element,
(m) a portion of the power transmission means aligned with the vertical shaft and rotatable about the vertical axis of the vertical shaft so that power may be transmitted from the power shaft to the earth bearing element when the earth bearing element is in any of several rotated positions about said vertical axis.

12. A sprinkling system which comprises:
(a) a water supply pipe adapted to have sprinkler means attached at spaced points therealong for dispensing water therefrom,
(b) a pair of frames secured to said pipe at spaced points and each extending ahead of and behind said pipe,
(c) mounting means on each frame for mounting one wheel ahead and one wheel behind said pipe with each mounting means having a horizontal wheel supporting axle extending therefrom and having a vertical element journalled in said frame for angular adjustment of each wheel about the vertical axis of one of said vertical elements,
(d) a powered drive shaft extending along said pipe, and
(e) power transmitting means carried by said frames extending from said drive shaft for applying tractive power to each of said wheels,
(ee) a portion of the power transmitting means aligned with the vertical axis.

13. The invention as defined in claim 12 wherein said power transmitting means includes
(f) a sheave driven from said drive shaft mounted for rotation about the vertical axis of said vertical element, and
(g) means for rotating said wheels responsive to rotation of said sheave.

14. The invention as defined in claim 13 wherein
(h) said sheave is driven by a belt from said drive shaft.

15. In an irrigation pipe moving system having:
(a) an elongated pipe adapted to carry water under pressure,
(b) a plurality of vehicles attached thereto to move the pipe,
(c) a shaft journalled for rotation on the vehicles, the improvement comprising;
(d) each vehicle having two brackets, each mounted for rotation about a vertical axis,
(e) a ground engaging wheel driven by a pinion engaging a gear attached to said wheel,
(g) said pinion mounted for rotation about the vertical axis of rotation of said brackets,
(h) a tube attached to said pinion extending upward therefrom,
(i) a sheave on top of the tube, and
(j) a belt interconnecting the shaft and the sheave for rotating the sheave.

(References on following page)

References Cited by the Examiner

UNITED STATES PATENTS

| | | | |
|---|---|---|---|
| 1,113,431 | 10/1914 | Groupe | 180—26 |
| 1,153,800 | 9/1915 | Larkins et al. | 180—31 X |
| 1,429,756 | 9/1922 | Mitchell | 239—213 |
| 2,174,600 | 10/1939 | Schutmaat | 239—212 |
| 2,726,895 | 12/1955 | Behlen | 239—155 |
| 2,741,510 | 4/1956 | McCulloch | 137—344 |
| 2,796,292 | 6/1957 | Maggart | 239—212 |
| 2,800,364 | 7/1957 | Dick et al. | 239—212 |
| 2,834,634 | 5/1958 | Johnson | 239—213 |
| 2,931,579 | 4/1960 | Rundell | 239—212 |
| 3,118,514 | 1/1964 | Bowman | 180—31 |

FOREIGN PATENTS

| | | |
|---|---|---|
| 374,330 | 4/1923 | Germany. |
| 1,026,020 | 1/1953 | France. |

EVERETT W. KIRBY, *Primary Examiner.*

D. MOSELEY, *Assistant Examiner.*